June 22, 1926.
E. G. OVERLY
ENVELOPE
Filed March 29, 1924  4 Sheets-Sheet 1
1,589,713
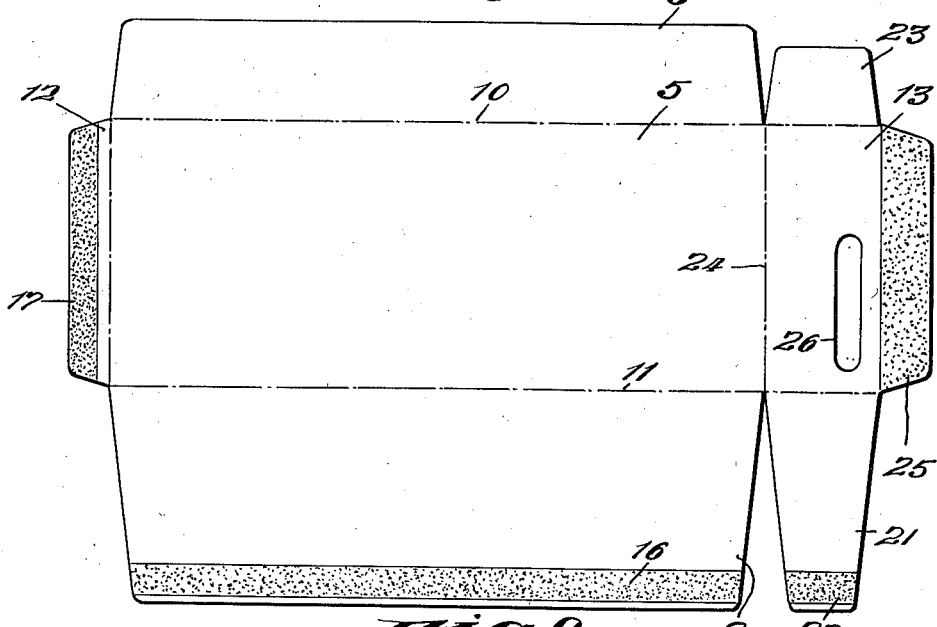
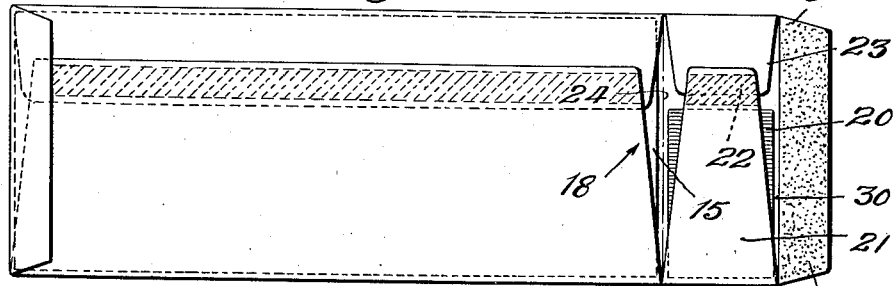
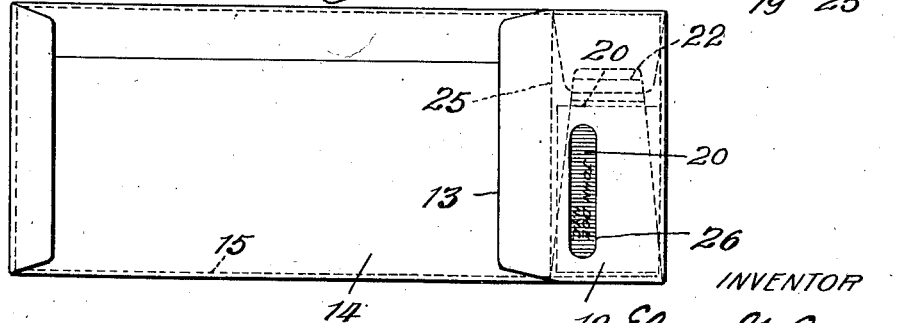
INVENTOR
Elmer G. Overly
BY
ATTORNEYS June 22, 1926.
E. G. OVERLY
ENVELOPE
Filed March 29, 1924      4 Sheets-Sheet 2
1,589,713
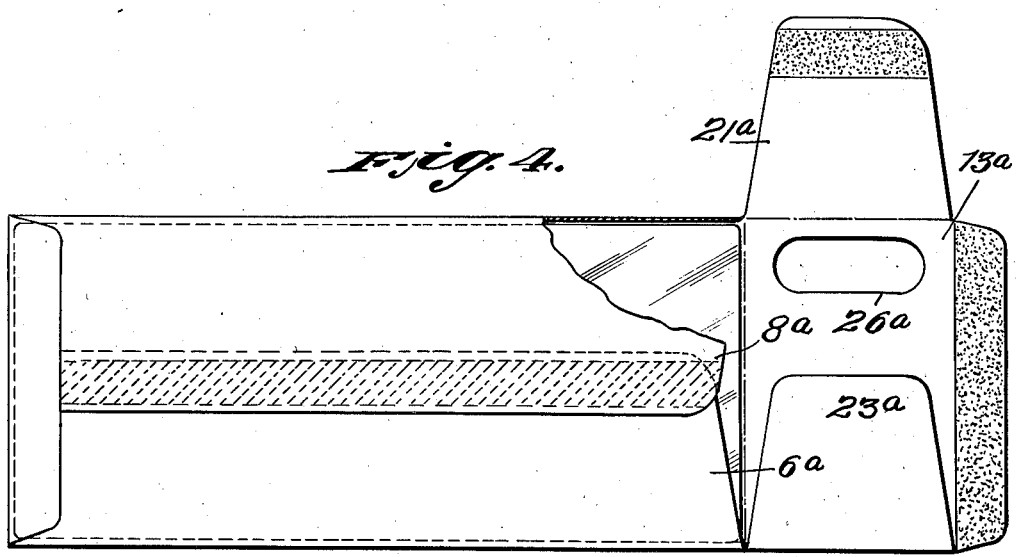
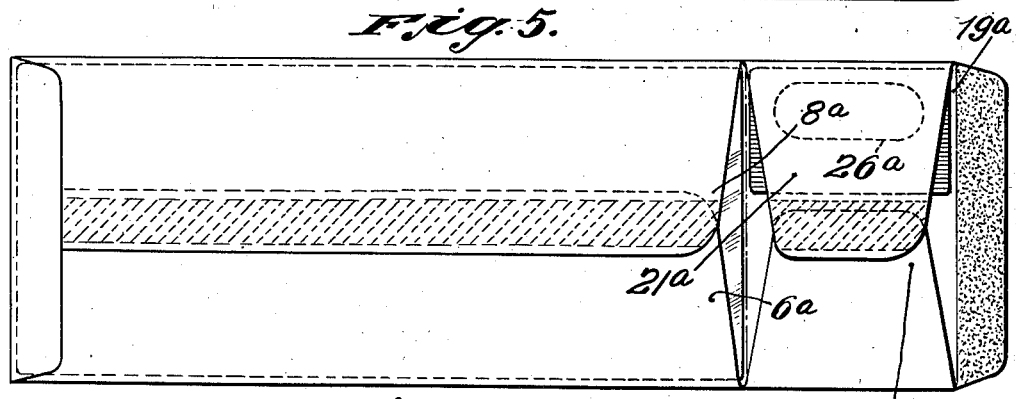
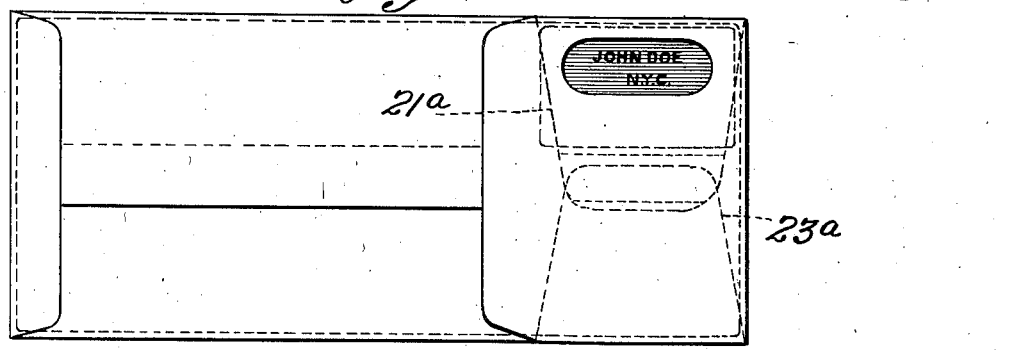
INVENTOR.
Elmer G. Overly
BY
ATTORNEYS.

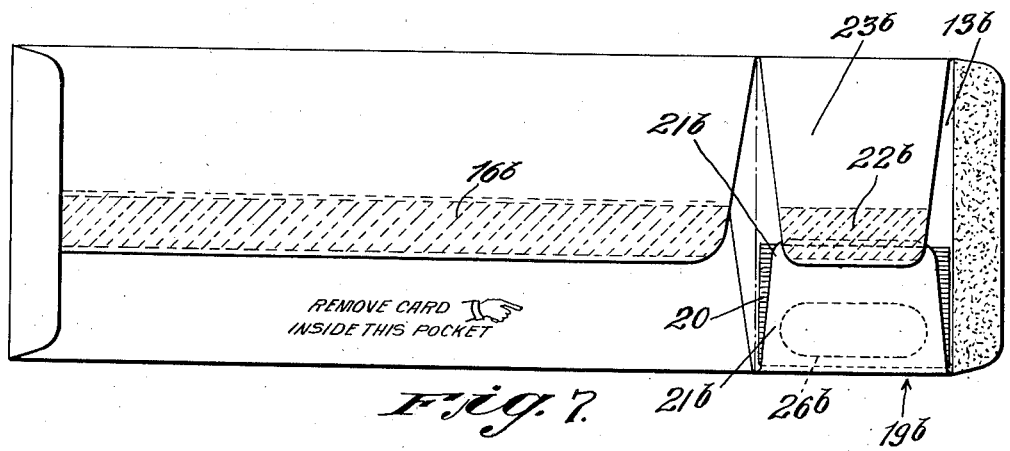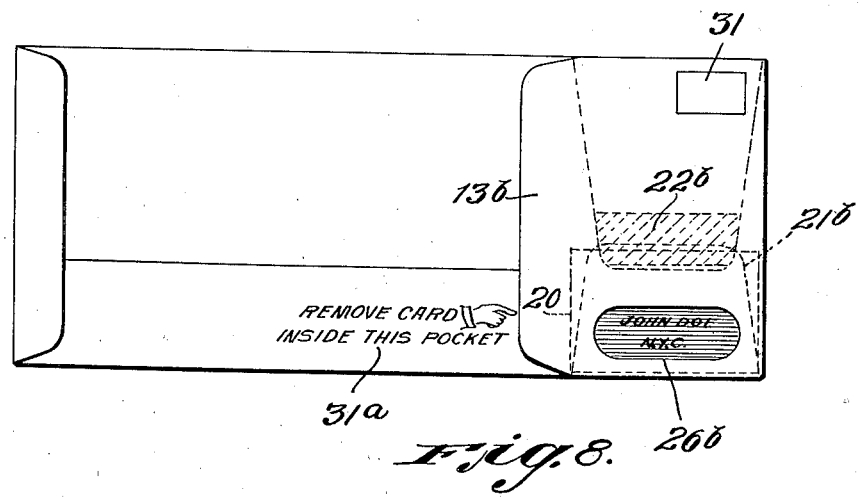

June 22, 1926.
E. G. OVERLY
ENVELOPE
Filed March 29, 1924 4 Sheets-Sheet 4
1,589,713
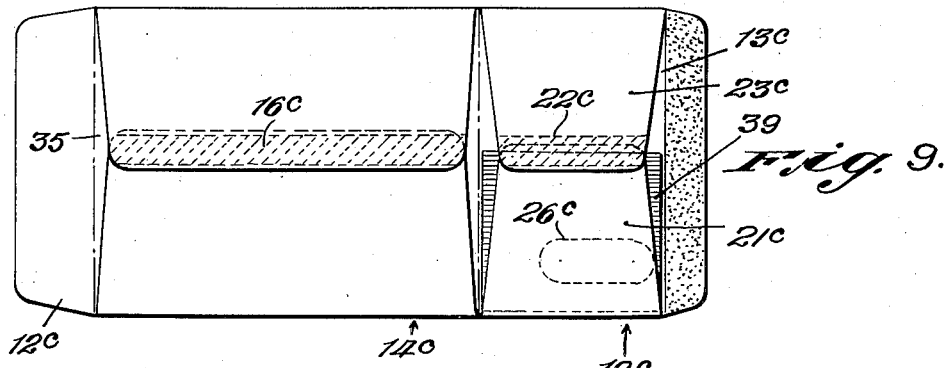
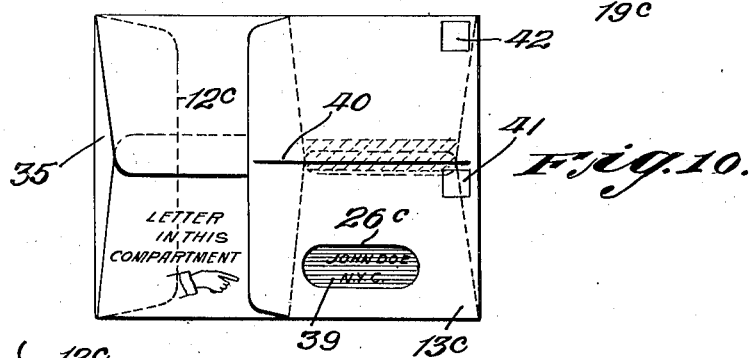
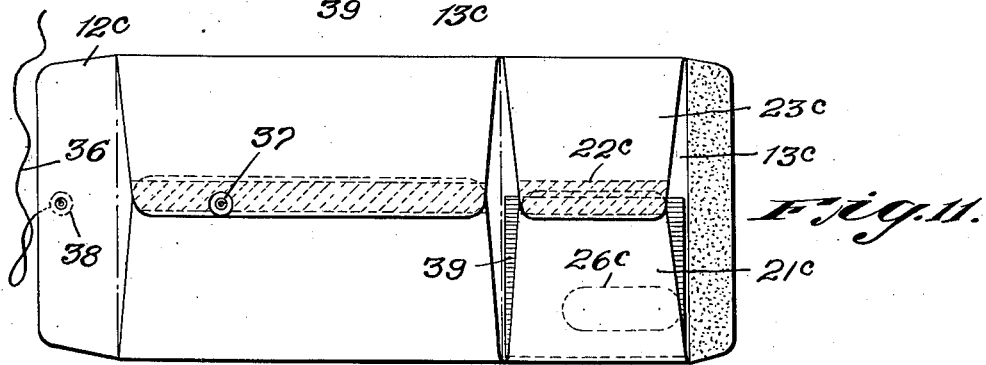
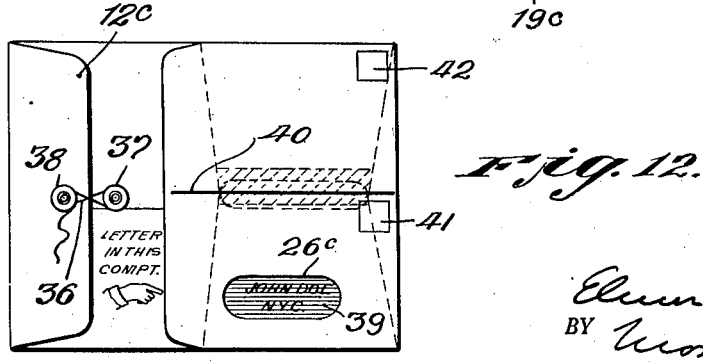
INVENTOR.
Elmer G. Overly
BY
ATTORNEYS.

Patented June 22, 1926.

1,589,713

UNITED STATES PATENT OFFICE.

ELMER G. OVERLY, OF GREENSBURG, PENNSYLVANIA.

ENVELOPE.

Application filed March 29, 1924. Serial No. 702,711.

This invention relates to envelopes having a plurality of compartments or fill openings and more particularly to the kind used for mailing automobile license plates with their corresponding license cards.

An object of the present invention is to construct the envelopes that they may be made entirely by machinery to avoid manual operation and thus reduce the cost of their manufacture to a minimum. To this end, the compartments of the improved envelope are located end to end so that the envelope blanks may readily be passed lengthwise through a machine to fold the flaps which form the compartments.

In carrying out the invention, the compartment for the license card is formed on the flap which closes the compartment of the license plate. This flap is provided at its edge with means, which may be a gum strip, to engage the wall of the compartment for the license plate to seal both compartments.

An important feature of the present invention consists in providing means on the seal flap whereby a compartment may be made of a width corresponding accurately to the size of the license card, irrespective of the width of the flap, so that the card will be retained snugly in position and the owner's name and address on the card will show through a window suitably positioned on the flap.

Another important feature of the invention is to have the window in the flap extend lengthwise of the envelope and to have it so located on the flap that it occupies the lower right-hand corner of the envelope after the flap has been folded back on the body portion of the envelope, so that the address which shows through the window will be parallel to the longitudinal edge of the envelope and may readily be read when the envelope is held in the customary position, i. e. with the longitudinal edge horizontal.

In a modified form of the invention the flap at one end of the large compartment of the envelope is left unsealed and may be accessibly closed, as for example by a tie string, for postal inspection of second class mail matter, such as catalogues, etc. In the smaller compartment which is formed on the seal flap at the other end of the large compartment, may be sent first class mail matter such as a letter which may relate to the contents of the larger compartment. The name and address appearing on the letter may be seen through a window. With this arrangement the inconvenience experienced in sending both articles in separate envelopes is avoided. The seal flap is also provided on the outside with a designation such as a line to indicate the upper border of the smaller compartment so as to assist in placing the postage stamp, for the first class mail matter, in the upper right hand corner of the smaller compartment, the postage stamp for the second class mail matter being placed in the upper right hand corner of the larger compartment.

Other features and advantages will hereinafter appear.

In the accompanying drawings:

Figure 1 is a plan view of the envelope blank before folding.

Figure 2 shows the envelope as ready for use with a license plate in one compartment and a license card in the other compartment.

Figure 3 shows the envelope sealed, with the license plate and card therein, and ready for mailing.

Figure 4 is a plan view of a modified form of envelope with one of the wings of the closure flap unfolded to show the construction thereof.

Figure 5 is a view similar to Figure 4, but showing the wing in its closed position.

Figure 6 is a view showing the envelope with the flap closed and sealed.

Figure 7 shows a form of envelope in which the small compartment and window are arranged on the flap so as to occupy the lower right hand corner of the envelope when the flap is folded back on the body portion of said envelope.

Figure 8 is a view similar to Figure 7, but shows the flap folded and sealed.

Figure 9 shows an envelope comprising a large compartment with a flap to accessibly close the compartment at one end for postal inspection of second class mail, and a seal flap at the other end, the seal flap having a small compartment for first class mail.

Figure 10 shows the envelope in Figure 9 after the flaps have been closed.

Figures 11 and 12 are views similar to

Figures 9 and 10, but show a different manner of holding the flap of the compartment for second class mail accessibly closed.

Similar character references indicate similar parts in each of the several views.

The envelope blank shown in Figure 1 comprises a body part 5, having side flaps 6 and 8 foldable back on the body part 5 along the lines 10 and 11. The body part is also provided with end flaps 12 and 13. The end flap 12 forms with the said flaps 6 and 8 the larger compartment 14 for a license plate 15 or other article. The side flap 8 and end flap 12 are provided with adhesive strips 16 and 17 respectively, to paste together the flaps forming compartment 14, leaving a fill opening for the compartment at 18, (Figure 2).

In addition to compartment 14, a smaller compartment 19 is provided which is used for the license card 20 or other article. This compartment 19 is provided on the flap 13 at the open end of the compartment 14 and is formed by a wing 21 foldable back on the flap 13, along a continuation of the line 11. The side flap 21 has a gum strip 22 which contacts partly with an intermediate portion of the end flap 13, as shown in Figure 2, and partly with a second wing 23, which is folded in at the other side of the end flap 13.

It will be observed that the compartment 19 extends only partially across the end flap 13, the width of the compartment being dependent upon the position of the sealing strip 22 on wing 21. The size of the compartment is such that it will snugly receive the license card 20 and prevent shifting of the same within the compartment during transit. This is an important feature of the present invention, particularly because the end flap is provided with a window 26, through which may be seen the name and address appearing on the license card to serve as a mailing address for the envelope.

The manner of use of the envelope will be readily understood. The license plate or other mail matter intended for the large compartment is inserted therein through the fill opening 18 and the corresponding license card or other mail matter intended for the smaller compartment is inserted through the fill opening 30. The sealing gum 25 is then moistened, and the end flap, after being folded over on line 24 into the position shown in Figure 3, is sealed against the body of the envelope. A single operation thus serves to seal both compartments of the envelope so that the same is at once ready for mailing.

In the modification illustrated in Figures 4, 5 and 6, the blank employed is of different proportions, the flap 13$^a$ being longer than in the previous form, and the window 26$^a$ being placed parallel to the longitudinal axis of the envelope. By reason of this construction, the owner's card may be inserted longitudinally into the compartment 19$^a$ of the flap, so that the address on the card will appear parallel to the longitudinal axis of the complete envelope as shown in Figure 6. It will be observed that in the modified form of construction, the side flaps 6$^a$ and 8$^a$ and the wings 23$^a$ and 21$^a$, differ in size from the corresponding flaps in the previous form, so that the compartment 19$^a$ for the owner's card is of the proper width for receiving the card lengthwise, as is shown in Figure 5.

In Figure 7 the arrangement of the smaller compartment which is formed on the flap 13$^b$, and the window 26$^b$ therein, is such that the name and address appearing on the license card 20 is located in the lower right hand corner of the envelope when the flap 13$^b$ is folded back to be sealed on the body portion of the envelope.

The envelope is preferably printed with a designation 31 for indicating the place at which postage should be affixed and also with a suitable legend 31$^a$ to apprise the recipient that the license card is contained under the flap.

It may be noted here that in the present modification the window 26$^b$ is placed under the ungummed wing 21$^b$, whereas in the previous form it was placed under the gummed wing. Either form of construction may be employed as desired.

In the form of the invention illustrated in Figures 9, 10, 11 and 12, the large compartment 14$^c$ formed in the body portion of the envelope is provided with a flap 12$^c$ at one end, which flap may be accessibly closed for the purpose of postal inspection of second class mail matter, such as catalogues, which may be carried in said compartment. The flap 12$^c$ may be held in place by inserting it into the fill opening 35 as indicated in Figure 10. Another manner of holding the flap closed, so that it may readily be opened for postal inspection is illustrated in Figures 11 and 12, where the flap 12$^c$ has secured thereto a tie string 36, which may be wrapped around a fastener 37 on the body part of the envelope and then around the fastener 38 on the flap 12$^c$ to hold said flap closed.

The other end of the compartment 14$^c$ is provided with a seal flap 13$^c$ having a smaller compartment 19$^c$ formed thereon by wings 21$^c$ and 23$^c$ to carry first class mail such as a letter 39, which may refer to the contents of the larger compartment 14$^c$. Said flap is also provided with a window 26$^c$, to expose the name and address appearing on the envelope when the flap is folded back on the body portion of the envelope.

The outside face of the seal flap 13$^c$ may be provided with a designation herein shown as a line 40, to indicate the top of the compartment 19$^c$ so as to assist in placing the postage stamp 41 for first class mail matter at the upper right hand corner of the compartment 19ᶜ, containing the first class mail. The postage stamp 42 for the second class mail matter is placed in the upper right hand corner of the envelope.

It will further be seen that in the various forms of embodiment of the invention, the side flaps and the wings of the end flaps are proportioned with reference to the size of the compartment for the article contained therein. The wings of the closure flap in all modifications are in line with the side flaps of the main compartment, and the gummed strips of the side flap and wing respectively are in line with each other, and are thus capable of being applied by the same gumming mechanism of the envelope machine. One of the wings in each of the modifications, namely 23, 23ᵃ, and 21ᵇ and 21ᶜ, is cut shorter than the corresponding side flap so that part of the strip of gum on the opposite wing will be applied directly to the body of the flap and thus form the closure for the owner's card or other article contained in the compartment.

It will thus be observed that the entire envelope is of such construction that it may be formed by ordinary envelope machinery, and requires no additional manual operations whatever. The envelope, therefore, is not only simple and convenient, but capable of being manufactured at very low cost.

It will be understood that many changes and modifications may be made in the forms of embodiment of the invention within the scope of the following claims without departing from the spirit and scope of the invention.

What I claim is:

1. An envelope comprising a body portion having a sealing flap having a window therein, and means on said flap provided with adhesive and foldable thereagainst to form a compartment of smaller area than the area of the flap.

2. An envelope comprising a body portion having a sealing flap having a window therein, a wing on said sealing flap extending part way across the flap and adhesively secured thereto to form a compartment on said flap, said compartment being of a width narrower than said flap, and means for sealing said flap on said body portion.

3. An envelope comprising a body portion having a large compartment, said body portion being provided with a fill opening and a closure flap therefor, said flap having a window and being provided with a wing for being folded against the flap to constitute a compartment, said wing being sealed against the flap at an intermediate portion thereof, so that the said compartment extends only partially across said flap.

4. An envelope comprising a body portion having a large compartment, said body portion being provided with a fill opening and a closure flap therefor, said flap having a window and being provided with a wing for being folded against the flap to constitute a second compartment, said wing being sealed against the flap at an intermediate portion thereof, so that the said compartment extends only partially across said flap, said flap being provided with a gummed extension beyond said wing for sealing said flap against the body portion, to thus constitute a closure for both said compartments.

5. An envelope comprising a body portion constituting a large compartment having a fill opening, a closure flap for the fill opening of said compartment, said closure flap being provided with a pair of wings for being folded over the flap to constitute therewith a small compartment, said small compartment being for a card bearing an address, said end flap having a window through which the name and address on the card may be observed, one of said wings of the end flap being provided with a strip of gum for being sealed partly over the other of said wings and partly against the intermediate portion of the end flap to thus reduce the width of the compartment formed on the end flap to a size commensurate with said card and thus prevent shifting of the card with reference to the window.

6. An envelope comprising a plurality of co-axial portions, a pair of flaps included in one of said portions, and a pair of wings included in the other of said portions, the lines of fold of said side flaps and wings being in alignment with each other, strips of sealing gum on one of said side flaps and on one of said wings, said strips being in alignment with each other, the ungummed side flap being of such length as to register with the strip of gum on the opposite flap to form one compartment, and the ungummed wing being of a length to extend only partially across the strip of gum on the opposite wing so that the remainder of said strip will seal against the body of the envelope blank to thus form a compartment extending only partially across the blank.

7. An envelope comprising a plurality of co-axial portions, a pair of flaps included in one of said portions and a pair of wings included in the other of said portions, the lines of fold of said side flaps and wings being in alignment with each other, strips of sealing gum on one of said side flaps and on one of said wings, said strips being in alignment with each other, the ungummed wing being of a length to extend only partially across the strip of gum on the opposite wing, so that the remainder of said strip will seal against the body of the envelope blank to thus form a compartment extending only partially across the blank.

8. An envelope comprising a body portion, a flap on said body portion, a wing on said flap folded in against the flap and secured thereto to form a compartment of a width narrower than the flap, said flap being foldable against the body portion, and means to seal said flap against the body portion, said flap having a window therein, which is disposed so as to extend lengthwise of the body portion and to be located at the lower right hand corner of said body portion when the flap is folded.

9. An envelope comprising a body portion having a compartment therein, a flap on said body portion, a wing on said flap folded in against the flap and adhesively secured thereto to form a compartment thereon narrower than the body portion, said flap being foldable to fold the narrow compartment over said body portion, said flap having a window therein which is disposed so as to extend lengthwise of said body portion and to be located at the lower right hand corner of said body portion when the flap is folded, and means at the free end of said flap to fasten it to said body portion.

10. An envelope comprising a body portion having a large compartment provided with a fill opening, a closure flap for said fill opening on said body portion, two wings on said flap, both wings being folded against said flap, one of said wings being sealed against said flap at an intermediate portion of the latter, said wing overlapping the free end of the other wing and being sealed thereon to form a compartment that extends only partially over said flap.

11. An envelope comprising a body portion having a large compartment provided with a fill opening, a closure flap for said fill opening on said body portion, two wings on said flap, both wings being folded against said flap, one of said wings being sealed against said flap at an intermediate portion of the latter, said wing overlapping the free end of the other wing and being sealed thereon to form a compartment that extends only partially over said flap, and a gummed extension on said flap beyond the compartment thereon to seal the flap against said body portion, said flap having an opening therein to form an elongated window for the compartment thereon, said window extending lengthwise of said compartment and being positioned at the lower right hand corner of the envelope when the flap is sealed on the body portion.

12. An envelope comprising a body portion having a flap provided with a window, means on said flap and separated from the body portion to hold an article which is narrower than the body portion against displacement on said flap, and means to seal the flap against the body portion, said holding means comprising a wing on said flap.

13. An envelope comprising a body portion having a large compartment for second class mail matter, a postal inspection flap accessibly closable at one end, a fill opening and a seal flap at the other end, the seal flap having a compartment thereon narrower than said flap for first class mail matter, said seal flap being foldable back on the body portion, and having a window through which may be observed the name and address appearing on the first class mail matter, said window being located on said flap to occupy the lower right hand corner of the envelope and extend lengthwise of said envelope, said seal flap having on its outside a designation to assist in placing the postage stamp for the first-class matter at the upper right hand corner of the compartment which contains the first class matter.

In testimony whereof I have affixed my signature to this specification.

ELMER G. OVERLY.